US007448326B2

(12) United States Patent
Benz et al.

(10) Patent No.: US 7,448,326 B2
(45) Date of Patent: Nov. 11, 2008

(54) APPARATUS FOR TRANSPORTING PRINTING-PAPER ROLLS

(75) Inventors: Martin Benz, Böhmenkirch (DE); Rudolf Stroh, Dürnau (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 332 days.

(21) Appl. No.: 11/345,887

(22) Filed: Feb. 2, 2006

(65) Prior Publication Data

US 2006/0182568 A1 Aug. 17, 2006

(30) Foreign Application Priority Data

Feb. 3, 2005 (DE) ...................... 10 2005 004 891

(51) Int. Cl.
*B60S 13/02* (2006.01)

(52) U.S. Cl. ........................................................ 104/48

(58) Field of Classification Search ................. 414/459, 414/495, 663; 104/96, 106, 288, 48, 273; 105/28, 33, 96, 96.1, 136, 180

See application file for complete search history.

(56) References Cited

U.S. PATENT DOCUMENTS

| | | | | |
|---|---|---|---|---|
| 3,450,062 A * | 6/1969 | Pradon | ....................... | 105/177 |
| 3,593,859 A * | 7/1971 | Spannlang et al. | .......... | 414/591 |
| 3,918,366 A * | 11/1975 | Noah | ......................... | 104/307 |
| 4,378,390 A | 3/1983 | Yoshida et al. | | |
| 5,097,770 A * | 3/1992 | Miyashita et al. | .......... | 105/72.2 |
| 5,879,752 A | 3/1999 | Murakami et al. | | |
| 6,637,335 B2 | 10/2003 | Jentzsch | | |
| 7,011,487 B2 | 3/2006 | Kafka et al. | | |

FOREIGN PATENT DOCUMENTS

| | | |
|---|---|---|
| DE | 80 31 892 U | 11/1980 |
| DE | 196 06 554 C1 | 6/1997 |
| JP | 59 038176 | 6/1984 |
| JP | 61-207257 | 2/1987 |
| JP | 06-345397 | 12/1994 |
| WO | WO 95/29765 | 11/1995 |

OTHER PUBLICATIONS

Search Report dated May 18, 2006 issued for the corresponding European Application No. 06 00 1922.

Patent Abstracts of Japan, Publication No. 02284674 dated Nov. 22, 1990.

Search Report dated Nov. 4, 2005 issued for the corresponding German Application No. 10 2005 004 891.9.

* cited by examiner

*Primary Examiner*—S. Joseph Morano
*Assistant Examiner*—Daniel V Venne
(74) *Attorney, Agent, or Firm*—Cohen Pontani Lieberman & Pavane LLP

(57) ABSTRACT

Apparatus for transporting printing paper rolls includes a frame for accommodating a printing paper roll, and a moving mechanism having a plurality of running wheels mounted on the frame and supporting the frame on a floor. The wheels can be aligned for travel in a first direction on a pair of first running rails on the floor, parallel to a printing press. When the frame is lifted by a lifting device so that the wheels are above the first rails, the wheels can be adjusted for travel in a second direction on a pair of second running rails which extend perpendicular to the first running rails.

6 Claims, 6 Drawing Sheets

APPARATUS FOR TRANSPORTING PRINTING-PAPER ROLLS

BACKGROUND OF THE INVENTION

1. Field of the Invention

The invention relates to an apparatus for transporting printing-paper rolls, having a frame and a moving mechanism with a plurality of running wheels for moving the frame along or parallel to a printing press.

2. Description of the Related Art

DE 196 06 554 C1 discloses an apparatus for transporting printing-paper rolls, which apparatus includes a main frame and a satellite frame. The main frame can be displaced, together with a satellite frame, along or parallel to a printing press. The satellite frame can be extended out of the main frame and can be displaced independently of the main frame in a direction which extends perpendicularly with respect to the movement direction of the main frame. A printing-paper roll can be picked up out of a roll store with the aid of the satellite frame, a printing-paper roll which is accommodated in the satellite frame being displaced with the aid of the main frame in the direction of the printing press. According to DE 196 06 554 C1, the main frame has a lifting device, in order to lift up a satellite frame which is accommodated in the main frame from a floor or to place it on the floor. In the state in which the satellite frame is lifted up slightly from the floor, the main frame can be displaced together with the satellite frame along the printing press.

According to DE 196 06 554 C1, a printing-paper roll is picked up and displaced relative to the printing press using two components, namely the main frame and the satellite frame. The use of a separate main frame for displacing the satellite frame parallel to the printing press requires high expenditure on material and space and is accordingly relatively expensive.

SUMMARY OF THE INVENTION

Proceeding from this, the present invention is based on the problem of providing a novel apparatus for transporting printing-paper rolls.

According to the invention, the or every frame can be displaced in a second direction relative to the printing press, which extends approximately perpendicularly with respect to the first direction. It is possible for this purpose to lift up the or every frame from a floor via a lifting device, and it is possible for the running wheels of the moving mechanism to be adjusted in this position of the frame which is lifted up from the floor.

The apparatus according to the invention combines the functions of the components which are configured separately according to the prior art, namely the main frame and the satellite frame, in a single frame. This frame can be displaced in two directions, namely in a first direction parallel to the printing press and in a second direction which extends approximately perpendicularly with respect to the first direction. This is realized by the adjustable running wheels of the moving mechanism. With handling properties which remain constant with regard to a printing-paper roll, the dimensions and the mass of the apparatus for transporting printing-paper rolls are reduced. As a result, the power requirement of the apparatus is also reduced. The overall result is lower costs.

Preferred developments of the invention result from the following description. Without being restricted thereto, one exemplary embodiment of the invention will be explained in greater detail using the drawing.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
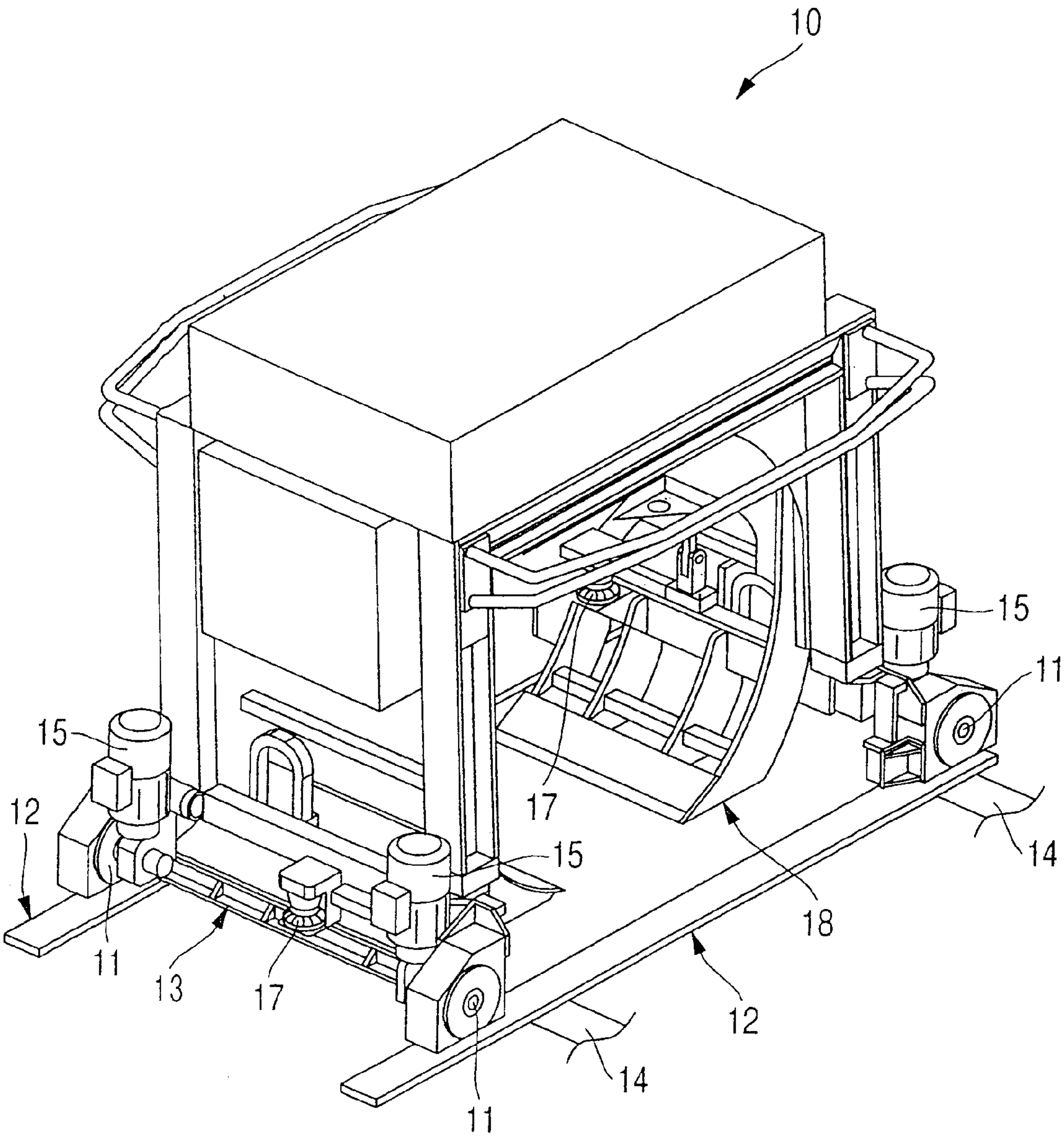
FIG. 1 is a perspective side view of an apparatus according to the invention for transporting printing-paper rolls.
Figure 4:
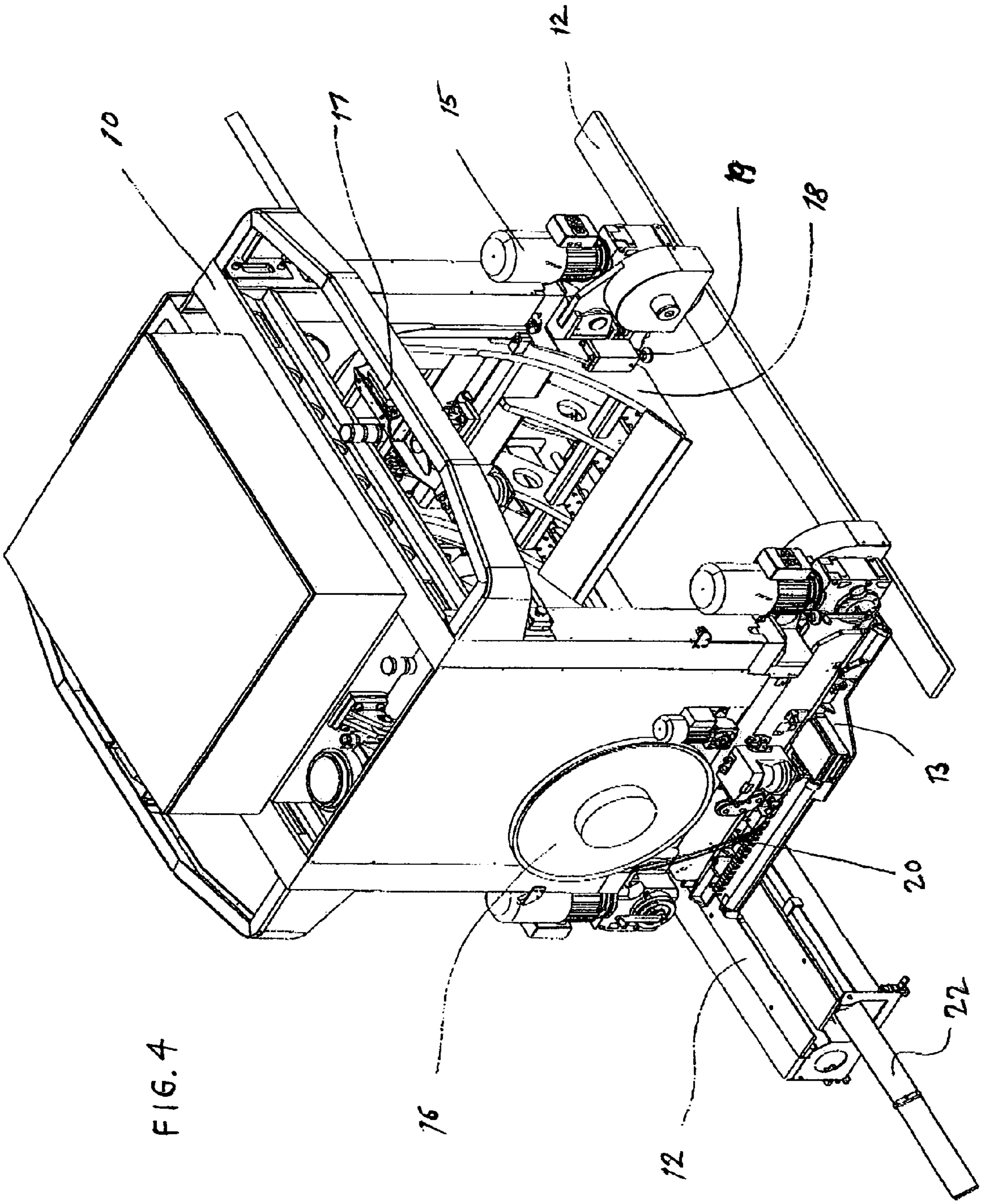
FIG. 4 is a perspective side view, rotated 180 degrees from FIG. 1, showing the lifting device and the current carrying rail.
Figure 5:
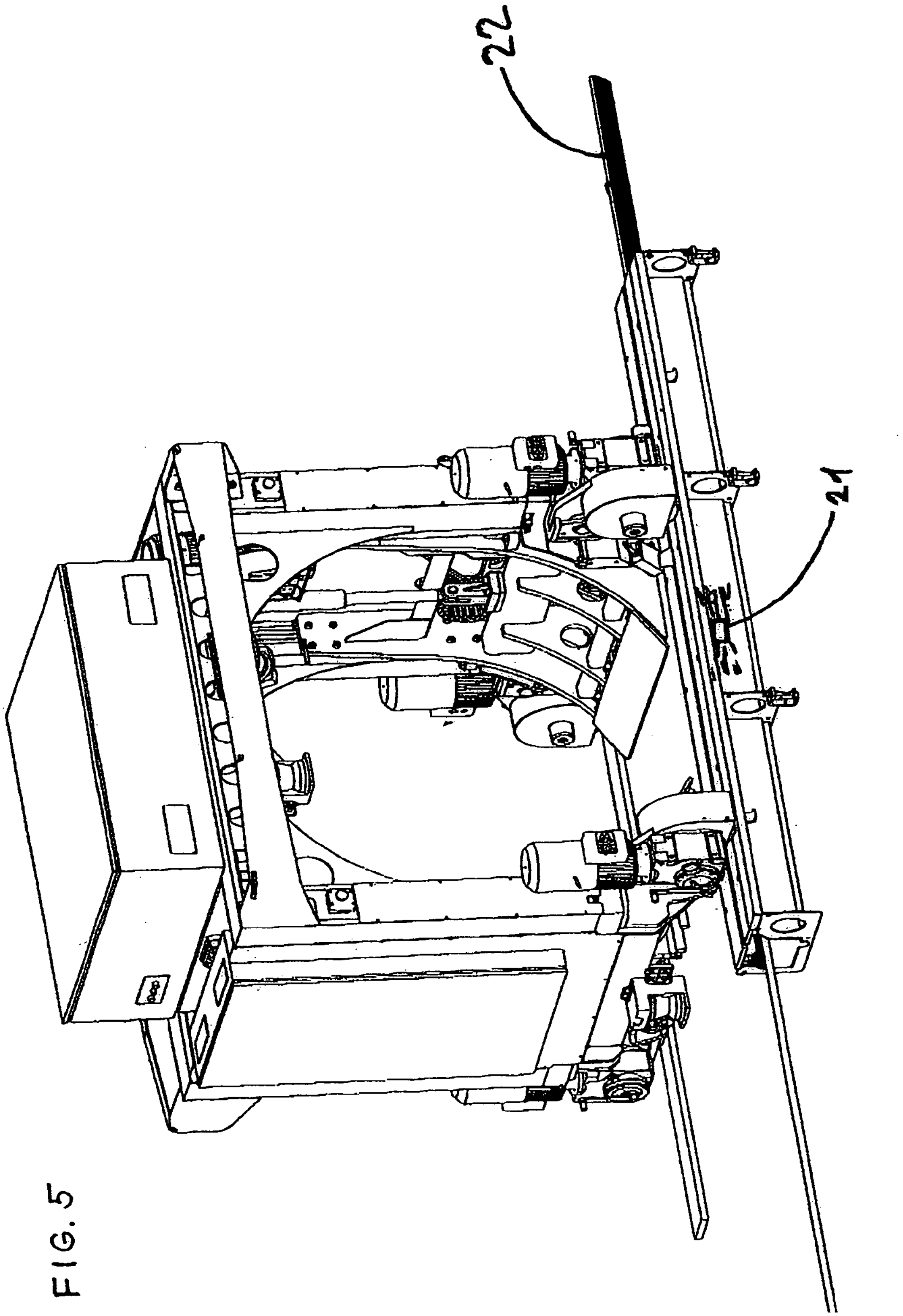
FIG. 5 is a perspective side view, similar to FIG. 1, showing the current pick-up.
Figure 6:
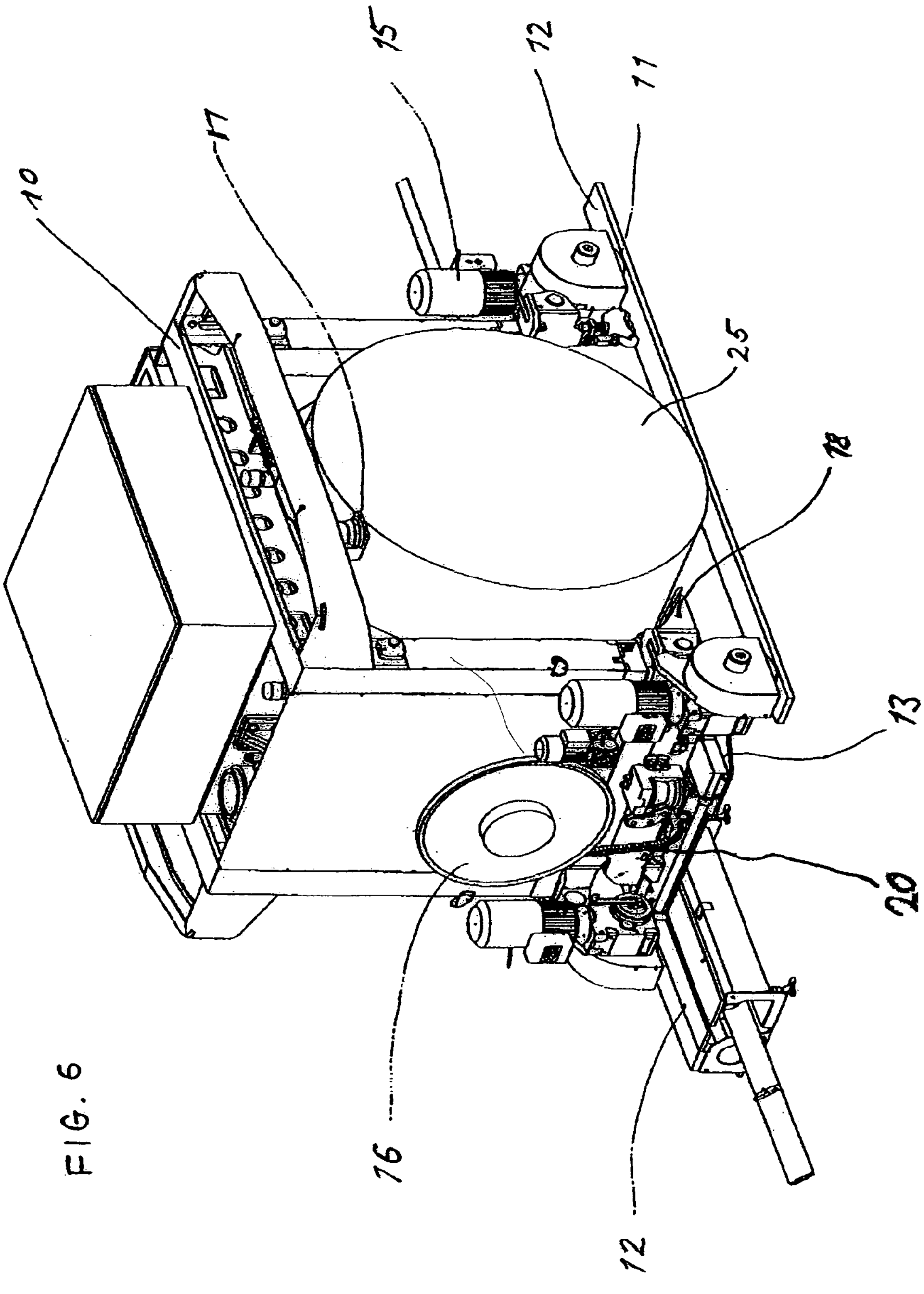
FIG. 6 is a perspective side view, rotated 180 degrees from FIG. 1, showing a printing paper roll in the frame.

FIGS. 1 to 6 show details of an apparatus according to the invention for transporting printing-paper rolls relative to a printing press, in different perspective views. The apparatus includes at least one frame 10 for accommodating in each case at least one printing-paper roll 25 (FIG. 6). The frame 10 has a moving mechanism which includes comprises a running wheel 11 at every corner of the frame 10. The frame 10 can be displaced with the aid of the running wheels 11 in a first direction parallel to a printing press, the running wheels 11 being guided here in running rails 12. Accordingly, the two running rails 12 which are shown in FIG. 1 extend parallel to the printing press and define the relative displaceability of the frame 10 parallel to the printing press. The displaceability of the frame 10 parallel to the printing press is assisted by a guide carriage 13 which can be displaced together with the frame 10 parallel to the printing press.

Figure 2:
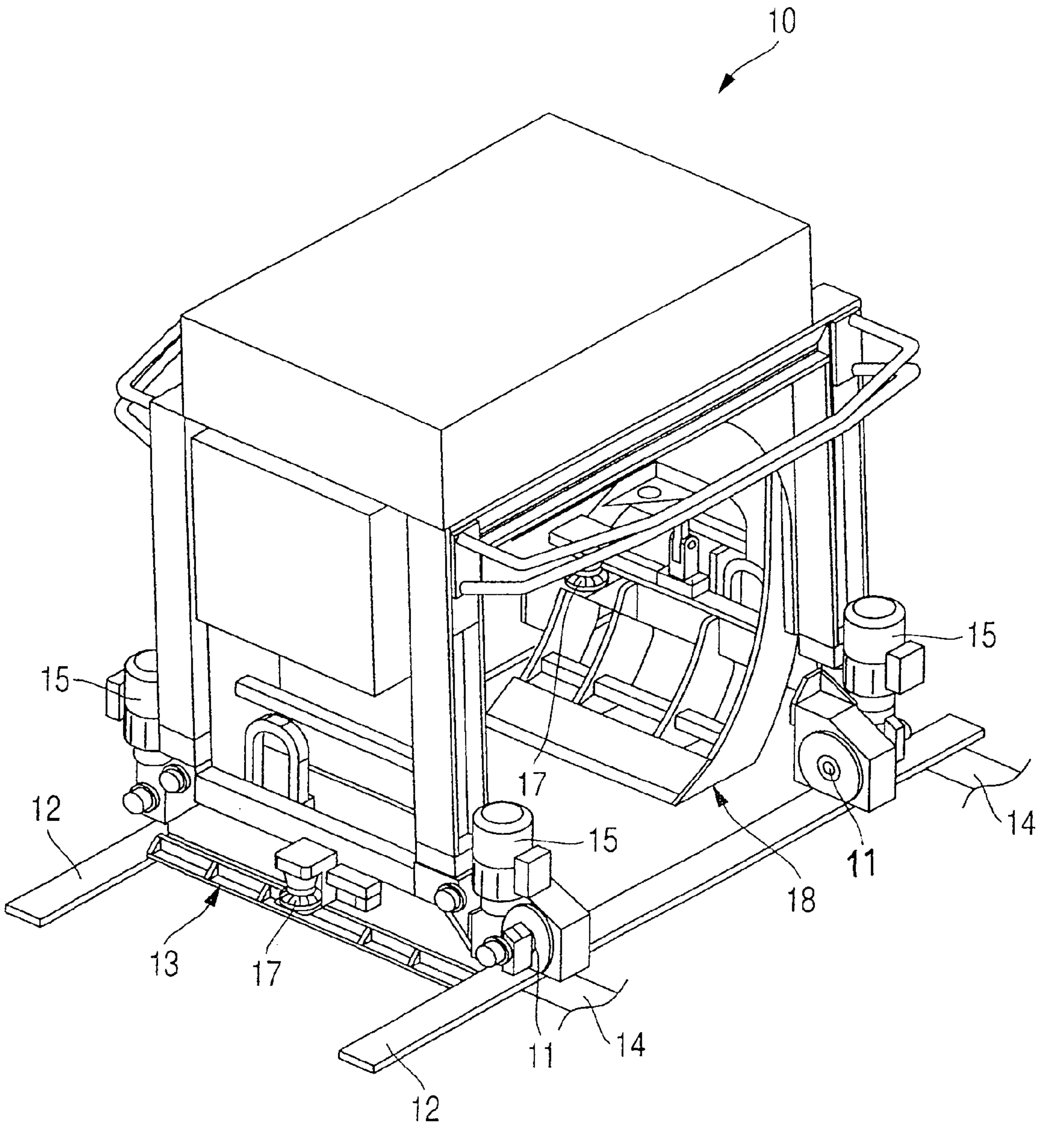
FIG. 2 is a further perspective side view of the apparatus, wherein the running rollers which have been rotated compared with FIG. 1.
Figure 3:
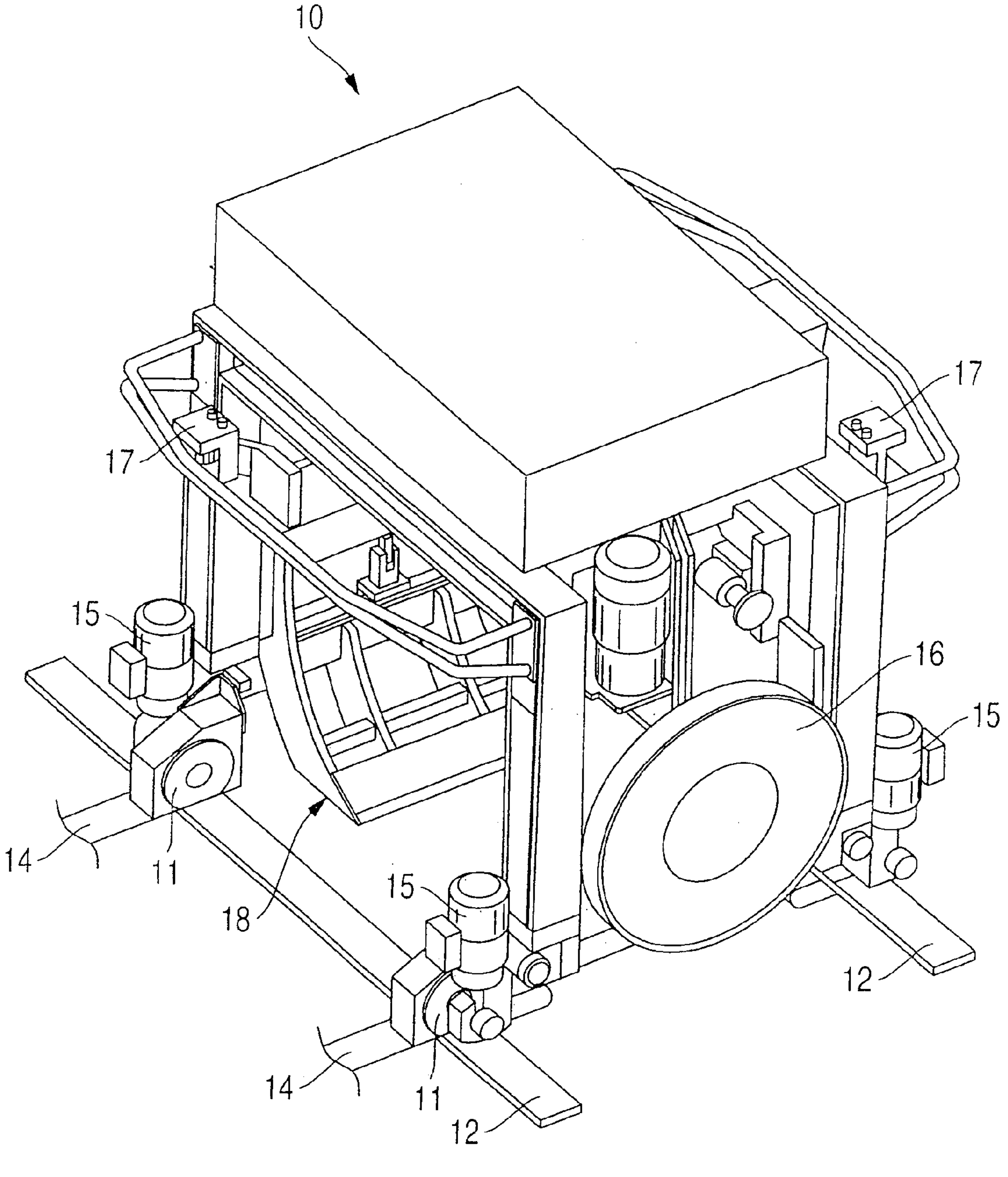
FIG. 3 is a perspective end view which has been rotated with respect to FIG. 2.

In terms of the present invention, the frame 10 cannot only be displaced in the first direction parallel to the printing press which is defined by the running rails 12, but can also be displaced in a second direction which extends perpendicularly to the first direction. For this purpose, the frame 10 can be lifted up from a floor via a lifting device, the running rollers 11 becoming disengaged from the running rails 12 during the lifting-off process. In this position of the frame 10 which is lifted up from the floor, the running wheels 11 of the moving mechanism can be adjusted, that is to say they can be rotated in each case by 90°. FIG. 2 shows the running wheels 11 in a position which has been rotated in each case by 90° with respect to FIG. 1.

After the running wheels 11 have been rotated, the frame 10 can be lowered via the lifting device, with the result that the running wheels 11 are moved into contact with the floor again, in order thus to make it possible for the frame 10 to be displaced relative to the printing press in the second direction. Here, the running wheels 11 are guided in running rails 14 which extend perpendicularly with respect to the running rails 12.

The lifting device is formed by at least two pushing-away elements 19 (FIG. 4) which are positioned on both sides of the frame 10. The pushing-away elements 19 are part of the frame 10 and can be displaced together with the frame 10 in both directions. The frame 10 can be lifted off from the floor symmetrically or uniformly via the pushing-away elements 19.

In the exemplary embodiment of FIGS. 1 to 6, each of the running wheels 11 of the moving mechanism is assigned a separate electric motor as drive 15. The drives 15 and further electrical devices which are assigned to the frame 10 have current supplied to them via a current pick-up 21 which can be displaced together with the frame 10 relative to a running rail 12 during a relative movement in the first direction parallel to the printing press. The current pick-up 21 (FIG. 5) is preferably integrated into the guide carriage 13. Accordingly, a current carrying rail 22 is integrated into the floor in the region of a running rail 12, the current pick-up 21 being in contact with the current carrying rail 22 and thus providing electrical energy to the frame 10. Just like the guide carriage 13, the current pick-up is of stationary configuration during a relative movement of the frame 10 in the second direction along the running rails 14 and thus perpendicularly with respect to the first direction which is defined by the running rails 12. The current is then supplied via a cable 20 (FIG. 4) which can be unwound from a drum 16 and is connected to the current pick-up 21.

The end of the cable 20, which is connected to the current pick-up 21, is accordingly configured to be stationary, just like the current pick-up and the guide carriage 13, during movement of frame 10 along the running rails 14 which extend perpendicularly to the running rails 12.

The frame 10 which can be displaced in two directions relative to the printing press is assigned all the devices for energy supply and for control of the same. The frame 10 is likewise assigned sensors 17 which are configured as laser scanners and serve to avoid collisions between the frame 10 and objects or persons located in the movement direction of the frame 10.

In the exemplary embodiment of FIGS. 1 to 6, the running rails 12 which are integrated into the floor serve to guide the frame 10 during the movement of the latter along the first direction parallel to the printing press, current supply lines such as a rail 22 being integrated into the floor. As an alternative, a guide rail can also be arranged together with current supply lines above the frame 10. However, integration into the floor is preferred for ergonomic reasons. The same is true for the running rails 14.

In order to pick up a printing-paper roll 25 with the apparatus according to the invention, the procedure is that a frame 10 having running rollers 11 which are situated in the position according to FIG. 1 is displaced relative to the printing press and parallel to the latter in the first direction. As soon as the frame 10 has reached the corresponding relative position parallel to the printing press, the frame 10 is lifted up from the floor with the aid of the lifting device, and the running rollers 11 become disengaged from the running rails 12. Subsequently, the running rollers 11 are rotated by 90° into the position shown in FIG. 2, and the frame 10 is placed on the floor again with the running rollers 11 engaging running rails 14.

The frame 10 can then be extended or displaced relative to the printing press in the second direction along the running rails 14. A printing-paper roll can then be removed from a store via gripping arms 18. After a printing-paper roll has been picked up, the frame 10 is moved back in the direction of the running rails 12. As soon as the corresponding relative position with respect to the running rails 12 has been reached, the frame 10 is lifted up together with the printing-paper roll, in order to rotate the running wheels 11 of the moving mechanism into the position shown in FIG. 1 again. The frame 10 can subsequently be displaced together with a printing-paper roll in the first direction parallel to the printing press.

Note that the running rails 14 have been omitted from FIGS. 4-6 for reasons of clarity, but should be considered as present and aligned with the wheels 11 in FIGS. 4 and 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Apparatus for transporting printing paper rolls, said apparatus comprising:

a frame for accommodating a printing paper roll;

a moving mechanism comprising a plurality of running wheels mounted on said frame and supporting said frame on a floor, wherein said wheels can be aligned for travel in a first direction, and wherein, when said frame is lifted so that said wheels are above said floor, said wheels can be adjusted for travel in a second direction which is transverse to said first direction;

at least one first rail which guides the frame during movement in the first direction;

a current pick-up fixed to the frame for providing electrical energy to the frame during movement in the first direction, wherein the current pick-up is stationary during movement in the second direction; and a cable drum carried by said frame, said cable drum having a cable which is connected to the current-pick-up and can be unwound from the drum during movement in the second direction.

2. The apparatus of claim 1 wherein the running wheels can each be rotated through 90 degrees, the second direction being perpendicular to the first direction.

3. The apparatus of claim 1 further comprising a lifting device fixed to the frame.

4. The apparatus of claim 1 wherein the at least one rail comprises a pair of first running rails in the floor, the running wheels engaging the first running rails for movement in the first direction.

5. The apparatus of claim 1 further comprising at least one second rail which guides the frame during movement in the second direction.

6. The apparatus of claim 5 wherein the at least one second rail comprises a pair of second running rails in the floor, the running wheels engaging the second running rails for movement in the second direction.

* * * * *